United States Patent [19]

Dunham et al.

[11] Patent Number: 5,742,758
[45] Date of Patent: Apr. 21, 1998

[54] PASSWORD PROTECTING ROM BASED UTILITIES IN AN ADAPTER ROM

[75] Inventors: Scott Neil Dunham, Cary; Charles Richard Dart, II, Raleigh; Benjamin Russell Grimes, Zebulon, all of N.C.

[73] Assignee: International Business Machines Corporation, Armonk, N.Y.

[21] Appl. No.: 681,740

[22] Filed: Jul. 29, 1996

[51] Int. Cl.$^6$ .................................................. G06F 11/00
[52] U.S. Cl. ........................................................ 395/186
[58] Field of Search ................................ 395/186, 187, 395/188.01; 364/286.4, 286.5, 130

[56] References Cited

U.S. PATENT DOCUMENTS

5,509,120  4/1996  Merkin et al. ........................ 395/186

*Primary Examiner*—Vincent P. Canney
*Attorney, Agent, or Firm*—Bernard D. Bogdon

[57] ABSTRACT

Provides management tools for a System Owner to assure that a personal computer system is secured against access by an unauthorized user by foreclosing the possibility of circumventing system's security protection during an I/O ROM scan. The POST code is designed to prompt for the proper security password prior to allowing any adapter ROM utility to be run. An interrupt service routine will detect key strokes during adapter ROM scan and prior to passing control to the adapter ROM for handling of the keyboard interrupt. Prior to the ROM Scan for the system, the POST code detects whether or not C2 Security is enabled. On some systems, the C2 functionally may not be used and, the system does not consider password protection for the adapter Utilities. If however, the C2 functionality of the system is enabled, the POST code will continue to enable the password protection for the ROM Scan. Once the interrupt service routine is established the ROM scan will begin. Once the ROM Scan is complete, the interrupt service routine will be unchained from the system, and progress will continue through POST.

16 Claims, 5 Drawing Sheets

PASSWORD PROTECTING ROM BASED UTILITIES IN AN ADAPTER ROM

TECHNICAL FIELD

This invention relates to personal computer systems and, more particularly, to such a system having security features which enable control over the access to data retained in such a system.

BACKGROUND

Personal computer systems in general and IBM Corporation personal computers in particular are being used in widespread fashion for providing computer power to many segments of modern society. Personal computer systems, including servers, can usually be defined as a desk top, floor standing, or portable microcomputer that consist of a system unit having components, including a single system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar or planar) to electrically connect these components together. These systems are designed primarily to give independent computing power to a single user and are inexpensively priced for purchase by individuals or small businesses. Examples of such personal computer systems are IBM's PERSONAL COMPUTER, AT IBM's PERSONAL SYSTEM/2 (PS/2)® Models 25, 30, 35, 40, L40SX, 50, 55, 56, 57, 65, 70, 80, 90 and 95 and IBM's PERSONAL COMPUTER PS/VALUE POINT™ and IBM'S PERSONAL COMPUTER THINKPAD®.

These systems can be classified into general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL® bus architecture exemplified by IBM's PERSONAL SYSTEM/2 Models 57 through 95. Early Family I models typically used the popular INTEL 8088 or 8086 microprocessor from Intel Corporation as the system processor. Certain later Family I and the Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provides hardware compatibility with software written for the 8086 and 8088 microprocessors.

In a computer system having hierarchical bus architecture, some computer systems include multiple buses for providing communication between various devices attached to the system and the central processing unit (CPU). Examples of the different types of buses present in such typical computer systems are a system bus to which a host CPU is attached and one or more peripheral buses to which one or more peripheral devices are attached. System-wide communication over different buses is required, however, if a device attached to one bus needs to read or write information to or from a device on another bus. Various types of buses are available to construct a given computer system.

One such bus which is becoming widely accepted is the PCI (Peripheral Component Interconnect) bus, which is capable of performing significant data transfer in a relatively short period of time. The PCI bus achieves this high level of performance, in part, because it can be directly linked to other high speed buses, such as system buses to which a CPU may be connected, and thus can provide for rapid transfer of data between devices attached to the PCI bus and devices attached to the system bus. In fact, the operation of several high integration devices, such as certain graphics package controllers, require a direct link to a system bus through a high performance bus, such as the PCI bus.

In addition, the PCI bus architecture does not require any "glue logic" to operate peripheral devices connected to it. Glue logic for other buses typically consists of miscellaneous hardware components such as decoders, buffers or latches that are installed intermediate to peripheral devices and the bus. A primary PCI bus can operate on a synchronous clock signal of 33 MHZ, and the strings of data transmitted over the PCI bus are 32 bits wide. A 32-bit data string on the PCI bus is called a double word (DWORD), which is divided into 4 bytes each comprising 8 bits of data. The address and data information carried by the PCI bus are multiplexed onto one signal. Multiplexing eliminates the need for separate address and data lines, which in turn, reduces the amount of signals required in a PCI bus environment as opposed to certain other bus architectures. The number of signals required in PCI bus architecture is between 45–47 while non-multiplexed buses typically require twice this number. Accordingly, because the number of signals are reduced, the number of connection pins required to support a device linked to the PCI bus is also reduced by a corresponding number. PCI architecture is thus particularly adapted for highly integrated desktop computer systems.

A more detailed description of the structure and operation of PCI bus architecture is provided in "Peripheral Component Interconnect (PCI) Revision 2.0 Specification", published Apr. 30, 1993; "Preliminary PCI System Design Guide", revision 0.6, published Nov. 1, 1992 by the PCI Special Interest Group, the contents of which references are incorporated herein by reference as if they were fully set forth.

To permit system-wide communication between devices on different buses, bus-to-bus bridges are provided to match the communications protocol of one bus with that of another. Generally, bus-to-bus bridges in a multiple-bus computer system are used to couple two buses to each other. Thus, when coupling the host CPU bus to a PCI bus, a CPU-to-PCI bus bridge is used. However, when coupling two PCI buses to each other, a PCI-PCI bridge is used.

To satisfy user requirements for higher reliability and performance (e.g., as in servers) personal computer systems are being built with more and faster processors, faster networks, faster data storage and data redundancy. In order to support higher performance computer systems, multi-level hierarchical bus architectures are being implemented where multiple PCI buses are coupled to each other in a hierarchical order via PCI-to-PCI bus bridges. Each PCI-PCI bridge within the hierarchy attaches a higher level or superordinate PCI bus to a lower level or a subordinate PCI bus. With this arrangement, one or more devices may be attached to a superordinate or a subordinate bus at each level of hierarchy. PCI compliant devices may attach directly to a PCI bus, whereas, other devices, such as ISA devices may couple to a PCI bus through an ISA-PCI bus bridging logic. Each device attached to the bus hierarchy requires a predefined amount of system resources, such as I/O address space, memory Address space and prefetchable memory address space. The parameters for the system resources, such as size, alignment and starting address determine how a particular system resource address space is allocated to the devices. Some devices, such as those compliant with Industry Standard Architecture (ISA), may require address range below 1 megabyte address range, Read Only Memory (ROM) address space and IRQ assignment. On the other hand other devices, such as PCI compliant devices may not be restricted to a particular segment and thus be given resource allocation anywhere within the PCI architecture's 4 gigabyte address space.

With the phenomenal growth and use of personal computers in the world in recent years, more and more data or information is being collected and retained or stored in such systems. A lot of this data is sensitive in nature. When such data becomes available to those for whom it was not intended, that data could be the subject of embarrassment to certain individuals, a company could lose a competitive edge, or sensitive data could be used to force payment for silence or lead to physical violence against individuals. As more users recognize the sensitive nature of data and its positive or negative value, the more it becomes desirable to protect against misappropriation and misuse of that data. To protect themselves and the persons associated with the stored data, users are requiring incorporation of security and integrity features into the personal computers that they purchase.

Users are not the only people to recognize the sensitivity of the data being collected and stored. Governments are also enacting laws to enforce protection of sensitive data. One such government is that of the United States. It has recognized and responded to the gravity of the situation. The United States federal government has defined security levels and the associated requirements it takes to meet those levels, and provides a certification agency for personal computer manufacturers to submit products in order to see if the products meet the security level claimed by the manufacturer. The source for the federal requirements is the Department of Defense, Trusted Computer System Evaluation Criteria, DOD 5200.28 STD, 12/85, generally referred to as The Orange Book. The government has legislated that as of Jan. 1, 1992 all data related to the government must only be processed and stored on personal computers with at least a security level of C-2. For computer system hardware, the essence of the requirements is contained in the Assurance section of The Orange Book at Requirement 6 wherein it states: "trusted mechanisms must be continuously protected against tampering and/or unauthorized changes . . . ."

Beginning with the earliest personal computer system of the Family I models, such as the IBM Personal Computer, it was recognized that software compatibility would be of utmost importance. In order to achieve this goal in an effective manner, an insulation layer of system resident code, also known as "firmware", was established between the hardware and software. This firmware provided an operational interface between a user's application program/operating system and the device to relieve the user of the concern about the characteristics of hardware devices. Eventually, the system resident code developed into a Basic Input/Output System (BIOS), for allowing new devices to be added to the system, while insulating the application program from the peculiarities of the hardware.

Included in the BIOS code is a Power-On-Self-Test (POST) code which performs a number of predefined tests on the system hardware and allows for the hardware to be configured by an end user to match the operational requirements needed. For example, the POST code generally tests the system memory and performs a ROM scan to detect additional I/O adapter card hardware.

Once POST has initialized the base function for the system, the adapter ROM Scan is initiated. This is a sequence of events whereby the system level POST code will search the memory address space looking for adapter ROM's in the memory address space by looking for a particular ROM signature or identifier in memory. The POST code will look for a valid ROM signature in the memory range of C000 up to the memory address of DFFFF in the memory map. The ROM Scan signature is '55AA'h and if found, will identify and adapter ROM present in the memory space. Once the adapter Rom is Found by POST, the ROM code will be verified by doing a CRC check. Once verified, the POST code will relinquish control to the adapter ROM. If the signature or identifier is located, POST will verify that the ROM is valid by running various authentication mechanisms. Once the ROM has been authenticated as a valid adapter ROM, POST will relinquish control to the ROM and the adapter ROM code will begin execution. Once the adapter ROM code has completed execution, and the adapter ROM is following the proper adapter ROM architecture, the adapter ROM code will return control to the system level POST.

Restated, and in summary, a user may invoke POST configuration utility by entering a predefined input which for example allows the user to designate a boot storage device from which an operating system is loaded. During ROM Scan, predefined system addresses are scanned for detecting and configuring I/O adapter cards. During ROM Scan, POST code searches the system memory for predefined signatures which, once detected, the system control is relinquished to the I/O adapter card. For example, if an external video adapter card is installed, during ROM scan the video card ROM code takes control of the system CPU to configure the system video features, such as allocating video memory space.

The importance of BIOS was readily evident because, for example, it freed a device driver from depending on specific device hardware characteristics while providing the device driver with an intermediate interface to the device. Since BIOS was an integral part of the system and controlled the movement of data in and out of the system processor, it was usual and expedient to make it resident on the system planar and was shipped to the user in ROM (read only memory). For example, system BIOS in the Family I IBM personal computer occupied 8K of ROM resident on the planar board.

Because of BIOS's role in controlling functionality and configuration of computer systems, it was evident that it is necessary to protect system BIOS against unauthorized access. Various password protection methods have been devised prompting users to enter an authorization key prior to allowing access to BIOS configuration utilities.

As new models of the personal computer and families have been introduced, such as those supporting the Micro Channel bus protocol and those supporting Peripheral Component Interconnect (PCI) bus protocol and those supporting the Micro Channel bus protocol, the BIOS was updated and expanded to accommodate new hardware and I/O devices. As a natural consequence, BIOS increased in memory size. For example, Family II systems utilize Advanced BIOS (ABIOS) which is larger than 96K in size. Due to such size increases in Family II systems, it became necessary to off-load portions of BIOS from the ROM. This was accomplished by storing portions of BIOS on a mass storage device such as a fixed disk, preferably in a defined portion of such a disk known as a System Partition. Once again it was quite apparent that a means for preventing unauthorized modification of the BIOS code, this time on the fixed disk, was highly desirable. This is the subject matter of U.S. Pat. No. 5,022,077 issued 4 Jun. 1991 and filed 25 Aug. 1989. That patent is hereby incorporated by reference into this specification to any extent necessary to a full understanding of the inventions here disclosed.

With the introduction of IBM's PS/2 Micro Channel systems and PCI systems came intelligent adapter cards which automatically performed the tedious job of setting adapter card configuration previously done by the customer settable jumpers. Utilities to configure the programmable registers or programmable option select (POS) registers were required for the systems. These, and other utilities to improve system usability characteristics along with system diagnostics, were shipped with each system on a system reference diskette.

With the advent of intelligent I/O adapter cards, I/O utilities stored in a local ROM are used to configure the I/O adapter card. These utilities are executed during what has been referred to as ROM Scan which occurs during POST initialization code. The utilities executed during the ROM scan are considered part of the configuration routines which come under the C-2 scrutiny and integrity architecture.

One of the features of the C-2 security design is the detection of tamper evidence on the system. With this design, the user will be able to detect whether a system has been physically tampered with or otherwise broken into. Upon detection of such tamper evidence, the POST is programmed to display a tamper evident error code and force the user to enter an authorization key.

Some of the I/O adapter cards are structured to provide for their I/O utilities to be invoked during a specified time interval. This can be accomplished by entering a predefined external input, such as a predefined key sequence. Once the predefined key sequence is entered, the ROM based utility takes control of the system CPU, giving the user the ability to change I/O related configuration. Thus, potentially, an unauthorized user is able to program an I/O ROM based utility to control the CPU to access to the system level configuration. As a result, the unauthorized user may select a boot device for loading an operating system for accessing secured data.

Unfortunately, currently only the system level configuration utilities and not the I/O adapter level utilities, are password protected and provide for some degree of full protection. Accordingly, these systems do not invoke any security routines when an I/O adapter key sequence is entered. As such, an unauthorized user can take control of the system by invoking the predefined key sequence without entering an authorization key, which is a security violation.

SUMMARY OF THE INVENTION

With the foregoing in mind, the present invention provides management tools for a System Owner or Authorized User to assure that a personal computer system is properly and more completely secured against access by an unauthorized user by foreclosing the possibility of circumventing system's security protection during an I/O ROM scan.

Figure 4:
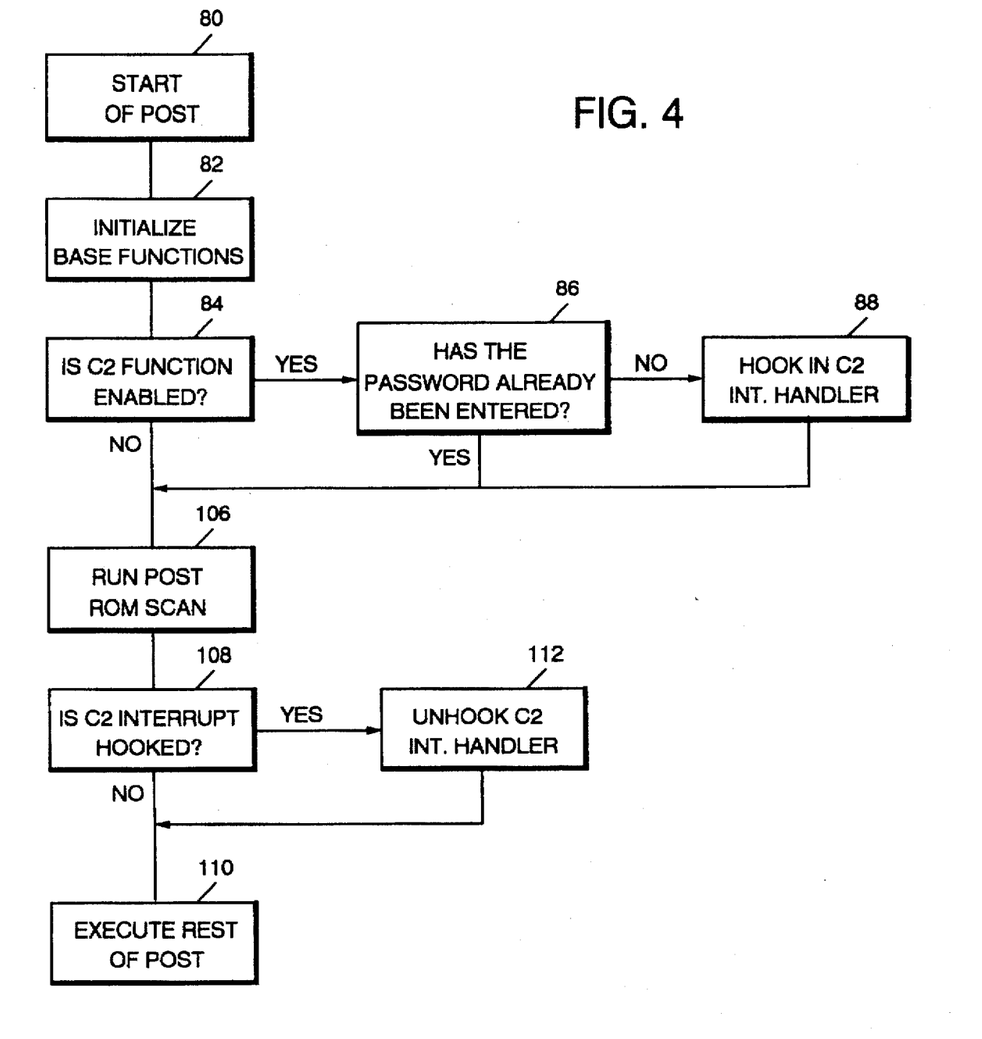
FIGS. 4 and 5 are schematic representations of certain components of the personal computer of FIGS. 1 and 2 which are related to the security features of the present invention.

Since adapter ROMs now present basis for precluding configuration utilities to be run during the system's POST ROM Scan, as shown in FIG. 4 at step 106, password protection is required during this time and not just at the end of POST as is typically done in the current systems.

The POST code in the present innovation is designed to prompt for the proper security password prior to allowing any adapter ROM utility to be run. This is accomplished by developing an interrupt service routine which will detect key strokes during adapter ROM scan and prior to passing control to the adapter ROM for handling of the keyboard interrupt.

The flow for this resolution is that first, prior to the ROM Scan for the system, the POST code detects whether or not C2 Security is enabled in the system as, for example, in FIG. 4 at step 84. On some systems, the C2 functionally may not be used and, if that is the case, the system does not consider password protection for the adapter Utilities and progresses through steps 108 and 110 of FIG. 4., as for example. If however, the C2 functionality of the system is enabled, the POST code will continue to enable the password protection for the ROM Scan. The next check determines if the password has already been entered during this cycle of the POST code in order to not prompt for the same password more than once during the POST cycle. See, for example, step 86 of FIG. 4.

The next step in POST flow is to enable an interrupt routine which will chain into the keyboard and mouse interrupt handlers of the system. Once the interrupt service routine is established through, for example, step 88 of FIG. 4, the ROM scan will begin. This interrupt service routine is optionally disposed where the password protection mechanisms reside during the ROM Scan. Once the ROM Scan is complete, as, for example, at step 106, the interrupt service routine will be unchained from the system, as, for example, at step 112 and progress will continue through POST at step 110.

Therefore, according to the present invention, a secure information handling system includes a central processing unit executing an initialization code. A protectable system in question also includes at least one device having a device utility code capable of controlling the CPU after at least one initialization code instruction has been executed. The device utility code is executed by entry of an external input to execute the device utility code. In order to prevent unauthorized control of the CPU, the system of the present invention includes a detector for intercepting the external input and an input handler responsive to detection of the external input for requesting entry of an authorization key. Once the authorization key is entered a verification means verifies the authorization key upon entry and system operation may continue. Otherwise, it is prevented.

It should be noted that this design is extensible to any type and/or variety of ROM scans that may occur in a computer system. It is not limited to any particular bus architecture and may be incorporated numerous times in a system POST as numerous ROM scans can reside in a system POST.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in described while arts may modify the invention herein described while still achieving the favorable results of this invention. Accordingly, the description which follows is to be understood as being a broad, teaching disclosure directed to persons of skill in the appropriate arts, and not as limiting upon the present invention.

Certain terms that may be used and may be helpful to the understanding of this invention and its intended use are as follows:

TRUSTED COMPUTING BASE (TCB): The trusted computing base is the totality of protection mechanisms within a computer system—including hardware, firmware and software—the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters (e.g. a user's clearance) related to the security policy.

TRUSTED SOFTWARE: Trusted software is the software portion of a Trusted Computing Base.

TRUSTED PROGRAM: A trusted program is a program included in Trusted Software.

OPEN PROGRAM: An open program is a program operable on a Trusted Computing Base and which is other than a Trusted Program.

REFERENCE MONITOR CONCEPT: A reference monitor concept is an access control concept that refers to an abstract machine that mediates all accesses to objects by subjects.

SECURITY KERNEL: The hardware, firmware and software elements of a Trusted Computing Base that implement the Reference Monitor Concept. It must mediate all accesses, be protected from modification and be verifiable as correct.

TRUSTED COMPUTER SYSTEM: A system that employs sufficient hardware and software integrity measures to allow its use for processing, simultaneously, a range of sensitive or classified information.

SYSTEM OWNER: The system owner is the user who is responsible for configuring and placing a system in secure mode initially. The system owner will control the configuration both initially and whenever an update needs to be made. This person will control the Privileged Access Password and be responsible for maintaining its integrity. The system owner will also maintain physical security of the tamper evident cover keylock key. The system owner will be responsible for maintaining security logs on all systems. The system owner will also record all attempted security breaches. The system owner may own more than one system. The system owner is considered an authorized user and can also be a normal user.

PASSWORD DESCRIPTION: The system has the potential to be protected by two passwords: first, Privileged Access Password (PAP) and second, Power On Password (POP). These passwords are intended to be used independently of one another. The PAP is designed to provide protection for the System Owner by protecting the Initial Program Load (IPL) device boot list, access to the password utility, and access to the System Reference Diskette or System Partition. The System Partition will only be booted in response to a POST error (or on a warm boot) if there is no PAP installed or the PAP was entered initially during the power on sequence. Initial BIOS Load (IBL) from a diskette will be secured in the same manner as booting the System Reference Diskette. The existence of the PAP will be transparent to a normal user using the POP. The PAP will be installed, changed, or deleted by a utility on the System Reference Diskette or in the System Partition. The PAP, when set and correctly entered, will give the System Owner access to the entire system, overriding the POP. The POP, working as, for example, on all current PS/2 systems, is used to prevent any unauthorized access to the operating system on the DASD (direct access storage device) or the facilities of the system.

SECURE MODE: Is the condition when a system owner has successfully installed the Privileged Access Password on a personal computer system to invoke security protection provided by the security and integrity elements.

AUTHORIZED USER: The authorized user is any user who is given permission to use the Privileged Access Password. This person may or may not be the System Owner. This person may also have a key for a particular system or a set of systems. If this person is involved in recovering a system from a security breach, the person is responsible for reporting it to the System Owner. An authorized user may also be a normal user.

NORMAL USER: A normal user is any user of a system authorized to use the system facilities. In order to change a system configuration or fix a problem, this user requires the assistance of either the System Owner or an Authorized User. The normal user does not have the Privileged Access Password or the tamper evident cover keylock key unless the user belongs to either the Authorized User or System Owner category.

UNAUTHORIZED USER: An authorized user is any one not defined as a System Owner, Authorized User or Normal User. Any use or modification of a secured personal computer system other than an unsuccessful power on, by an unauthorized user is considered a security breach and an audit trail must exist showing such breaches.

EEPROM: EEPROM means Electrically Erasable Programmable Read Only Memory. This memory technology provides for non-volatile storage of data that can be changed under control of hardware logic. Contents of such storage is not lost when power is absent. Contents may be altered only when the appropriate controls signals on the module are activated in a predefined sequence.

Figure 1:
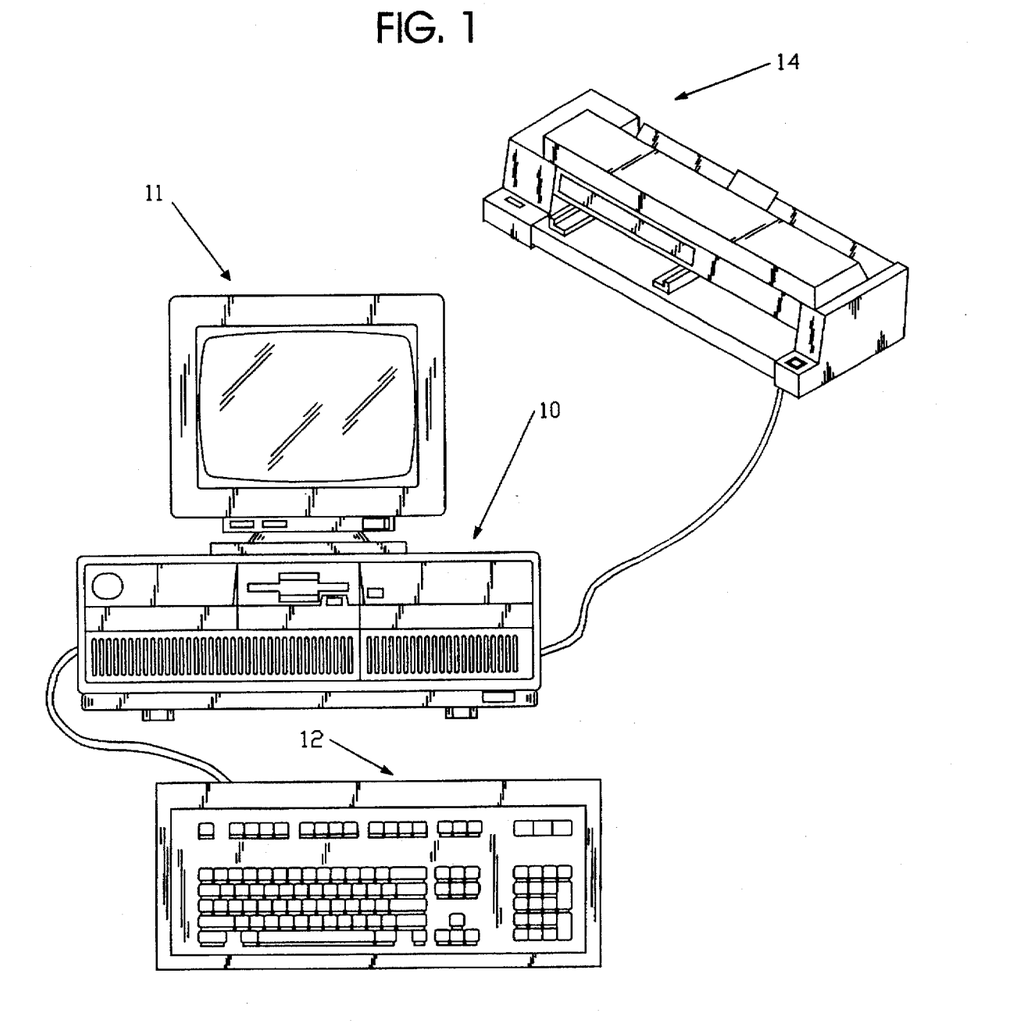
FIG. 1 is a perspective view of a personal computer embodying this invention.
Figure 2:
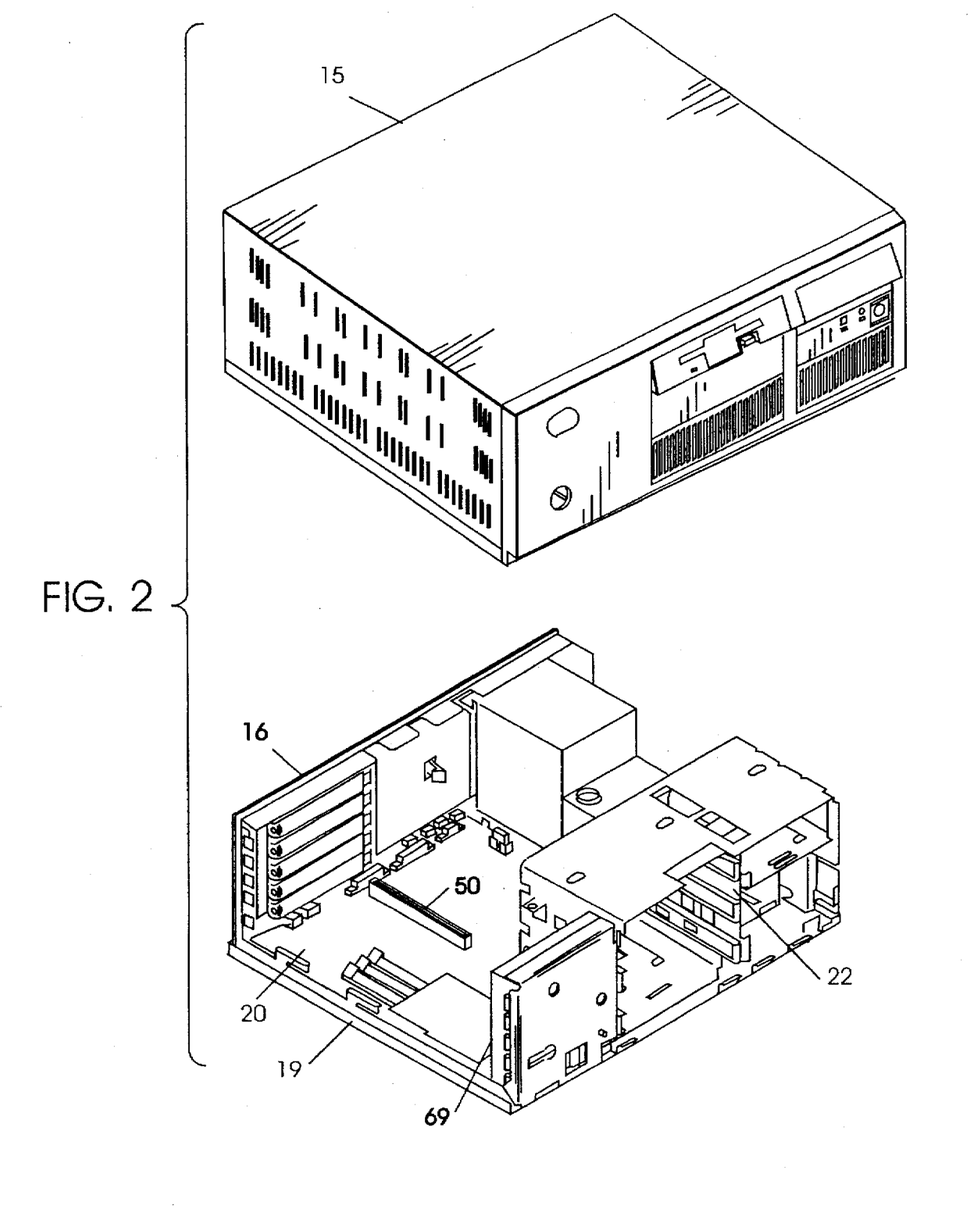
FIG. 2 is an exploded perspective view of certain elements of the personal computer of FIG. 1, including a chassis, a cover, and a planar board and illustrating certain relationships among those elements.

Referring now more particularly to the accompanying drawings, a microcomputer embodying the present invention is there shown in FIG. 1 and generally indicated at 10. As considered hereinabove, the computer 10 may have an associated monitor 11, keyboard 12 and printer or plotter 14. The computer 10 has a cover 15 which cooperates with a chassis 19 in defining an enclosed, shielded area for receiving electrically powered data processing and storage components for processing and storing digital data, as shown in FIG. 2. In the form illustrated in FIG. 2, the computer 10 also has an optional I/O cable connection cover 16 which extends over and protects the connection points of I/O cables with the computer system. At least certain of the system components are mounted on a multi layer planar 20, also described herein as a motherboard or system board. The planar 20 is mounted on the chassis 19 and provides a means for electrically interconnecting the components and modules of the computer 10 including those identified above and such other associated elements as floppy disk drives, various forms of direct access storage devices, accessory cards or boards, and the like.

The chassis 19 has a base and a rear panel as seen in FIG. 2, and which may be covered externally by the cable connection cover 16 and defines at least one open bay for receiving a data storage device such as a disk drive for magnetic or optical disks, a tape backup drive, or the like. In the illustrated form, an upper bay 22 is adapted to receive peripheral drives of a first size, such as those known as 3.5 inch drives. A floppy disk drive, a removable media direct access storage device capable of receiving a diskette inserted therein and using the diskette to receive, store and deliver data as is generally known, may be provided in the upper bay 22.

Figure 3:
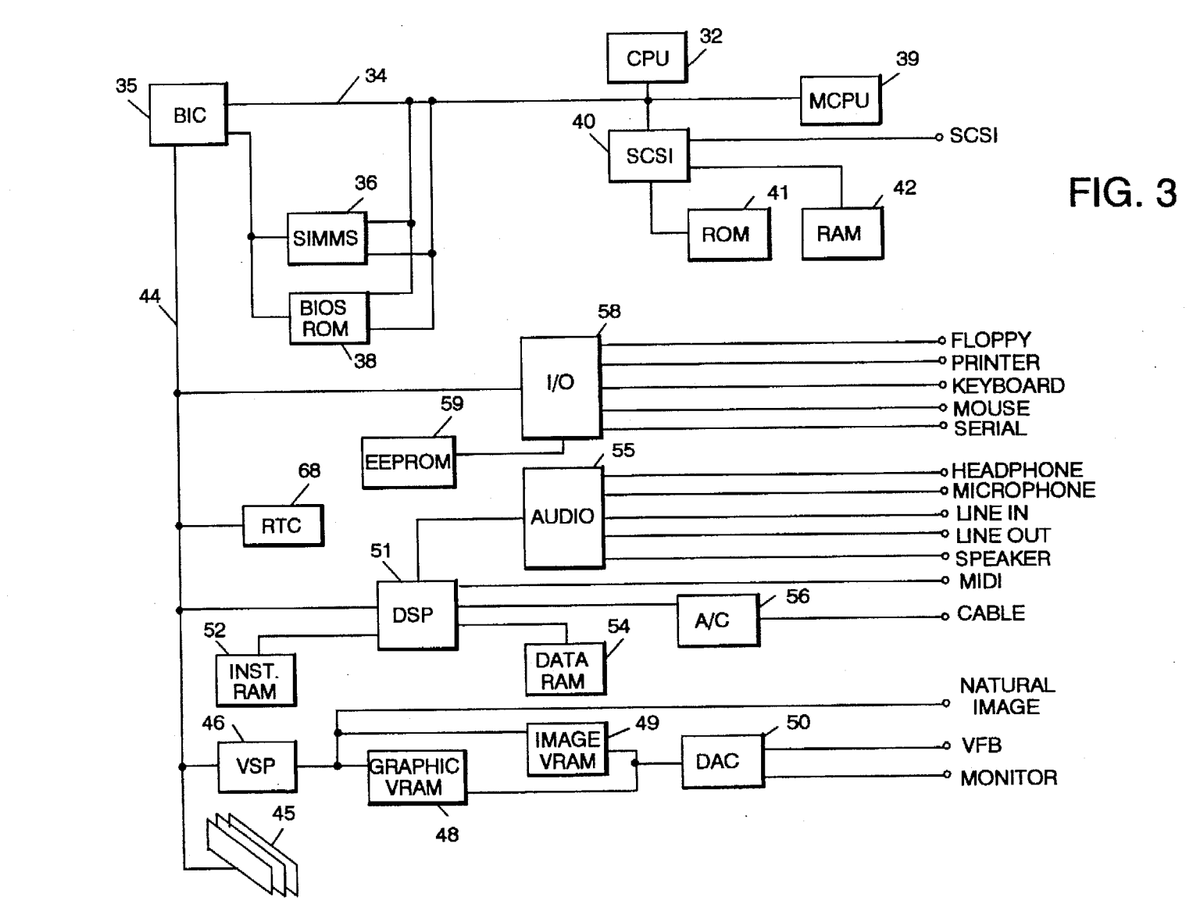
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system, such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL Corporation. The CPU 32 is connected by a high speed CPU local bus 34 to a bus interface control unit 35, to volatile random access memory (RAM) 36 here shown as Single In line Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. The ROM 38 also has an interpreter program stored therein for enabling interpretation of and operation of the CPU 32 in response to direct entry of commands by a user of the personal computer system.

Heretofore, the interpreter program has typically accepted keyboard entry of characters and been capable of interpreting beginner's all-purpose symbolic instruction code (BASIC), although it is contemplated that other forms of command entry and possibly other codes may be used. For examples, entry of commands may be by a voice recognition audio input system or a pen based handwriting or touch point input system. For purposes of this disclosure, all such input devices are identified as "user input devices" and the computer recognizable inputs are identified as "commands". Instructions stored in the BIOS ROM 38 can be copied into RAM 36 to decrease the execution time of BIOS. The system also has, as has become conventional, a circuit component which has battery backed non-volatile memory (conventionally CMOS RAM) for receiving and retaining data regarding the system configuration and a real time clock (RTC) 68 (FIGS. 3 and 4).

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40, as is known to persons skilled in the arts of computer design and operation, may be connected or is connectable with Read Only Memory (ROM) 41, RAM 42, and suitable internal or external devices of a variety of types as facilitated by the I/O connection indicated to the right in FIG. 3. The SCSI controller 40 functions as a storage controller in controlling storage memory devices such as fixed or removable media electromagnetic storage devices (also known as hard and floppy disk drives), electro-optical, tape and other storage devices.

At least one such storage device, within upper bay 22 in accordance with this invention, is a mass storage device mounted within the system enclosure and, for example, connected to the SCSI bus, in FIG. 3 and inaccessible for user removal. This particular identified mass storage device has a system partition and is operatively connected with the CPU 32 for storage of programs and data in and retrieval of programs and data from the mass storage device. The system partition in the device has been addressed hereinbefore. The significance of the device not being user accessible is that it is protected by the system security features from physical access for tampering or removal and replacement.

The process of bringing a personal computer into operation progresses through a series of steps which have been identified by particular terminology which has come to have meaning generally understood by persons skilled in the relevant arts and includes meanings set forth hereinbefore. The person of skill will understand the meanings of POST (Power On Self Test); IML (Initial Machine Load); and IPL (Initial Program Load). POST calls IML which calls IPL which loads an operating system for the personal computer system which is being brought into operation. Portions of POST, IML and IPL may be distributed among the ROM 38 and system partition described hereinbefore. IML loads into a designated area of RAM, as for example SIMMS 36 of FIG. 3, an image of a run time BIOS, an interpreter program as herein described, and certain portions of POST. IPL loads a designated operating system from a source identified on a prioritized list supplied by the System Owner. This last identified function is here identified as a prioritized initial loading program.

Commonly, the IPL program is stored in a partition of the mass storage device for enabling initial loading of an operating system from a selected one of a plurality of sources including, for example, any bootable mass storage device or diskette mounted in a floppy disk drive, the system partition of the mass storage device, and any reference diskette in place in a floppy disc drive of the system 10. The prioritized initial loading program normally designates the BASIC interpreter program stored in ROM 38 or loaded into RAM as a final option default in the event of failure of access to an operating system from any other one of such a plurality of sources.

The bus interface controller (BIC) 35 couples the CPU local bus 34 with an I/O bus 44. By means of the bus 44, the BIC 35 is coupled directly or indirectly with an optional feature bus such as a MICRO CHANNEL bus having a plurality of I/O slots for receiving MICRO CHANNEL adapter cards 45 which may be further connected to a memory or I/O device, for example, a serial or parallel port (not shown). The I/O bus 44 includes address, data, and control components.

Coupled along the I/O bus 44 are a variety of I/O components such as a video signal processor 46 which is associated with video RAM (VRAM) for storing graphic VRAM information at unit 48 and for storing image VRAM information at unit 49. Video signals exchanged with the processor 46 may be passed through a Digital to Analog Converter (DAC) 50 to a monitor, VFB (video feature buffer) or other display device. Provision is also made for connecting the VSP 46 directly with what is here referred to as a natural image input/output, which may take the form of a video recorder/player, camera, etc.

The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Further, the I/O bus 44 is coupled with a input/output controller 58 with an associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown) and other multi-media input device (not shown), and the exchange takes place by means of a serial port. The EEPROM plays a role in security provisions as herein described and in assignee's U.S. Pat. No. 5,388,156, issued 7 Feb., 1995, filed 26 Feb. 1992, and entitled "Personal Computer System with Security Features and Method". That patent is hereby incorporated by reference into this application. That patent provides discussion of a layered password protection strategy.

In achieving certain objectives of securing a personal computer system as described herein, the personal computer system 10 has an erasable memory element mounted within the system enclosure for selective activation to active and inactive states and for receiving and storing a Privileged Access Password when in the active state. The erasable memory element preferably is at least one field or portion of the electrically erasable programmable read only memory device or EEPROM 59 of FIG. 3 described above. The system also has an option or security switch mounted within the enclosure on the planar board 20 and operatively connected with the erasable memory element 59 for setting the used field or portion of that memory element to the active and inactive states. The option switch, also referred to as a security switch herein may be, for example, a jumper mounted on the system planar 20 and manually settable to two different states by a person having access to the planar. In one state (also referred to herein as the write enable or unlocked state), the EEPROM 59 is set to be active and to store a PAP as described herein. In the write enable state, the PAP may be written to the EEPROM, changed or removed. In the other or inactive state, also referred to herein as the write disabled or locked state, the PAP storage capability of the EEPROM is set to be inactive.

As mentioned above, the system 10 also has a second component having erasable memory capabilities, namely battery supported, non-volatile CMOS RAM and an associated real time clock (RTC) 68. The CMOS RAM stores data indicative of the system configuration including, in accordance with this invention, data regarding the successful entry of the PAP on power up of the system 10. At least one tamper detection switch that electrically connects the cover 15 to the chassis 19 is provided, mounted within the enclosure and operatively connected with the CMOS RAM for detecting opening of the enclosure and for clearing or setting certain data stored in that memory element in response to any switching of the tamper detection switch.

The security and integrity features described above and hereinafter, work independently of a previously offered personal computer security feature, the Power On Password (POP). These additional security and integrity features provide a secure platform for operating system certification under applicable regulations such as The Orange Book. An additional password is required to place the system in secure mode. The new password is here referred to as the Privileged Access Password (PAP). To maintain compatibility with previous personal computer systems, the POP is still supported.

Password security is implemented by system hardware features including an EEPROM 59, a security switch and a tamper evident cover switch, firmware, POST and the system software password utility. Once the PAP has been installed, the system is in Secure Mode. The PAP is saved in the EEPROM. A backup copy of the PAP is also maintained in the EEPROM. The backup copy is maintained to prevent accidental loss of the PAP when a power failure occurs during the installation, change, or removal of the PAP. The POP and at least certain bits indicative of the validity of the PAP, when installed, are stored in the CMOS RTC 68. Changes in data retained in the CMOS RTC and in the EEPROM are independent one from the other.

Two bits in the EEPROM are used as a state machine that lets POST know the location of where a power outage occurred in the update sequence and, if possible, avoid a system board replacement situation. The password utility maintains the update indicator field, a two bit state machine used during any access to the PAP. If a power outage occurred during the password modification, when power is restored, POST checks the state machine. POST actually checks the state machine on all power ups. If the PAP is updated successfully (a '00' state), POST proceeds in the normal manner. If the update has started before power is lost (a '01' state), POST will check for the presence of a valid backup PAP. If valid, POST copies the backup PAP into the storage for the primary PAP. If the option or security switch is not in the unlocked or write enable position an error will be displayed. The System Owner will have to intervene by unlocking the system covers and changing the position of the security switch. If the primary PAP has been updated successfully (a '01' state), POST will use the primary PAP (the new PAP) to validate any attempts to use the system reference diskette or boot the system partition. POST will assume the backup PAP is invalid. POST will copy the primary PAP to the backup PAP in this case.

If the backup PAP has been updated successfully (a '11' state), both the primary and backup PAP are considered valid and POST will verify the validity of the Primary PAP, prior to confirming the entry of the PAP by the user.

Figure 5:
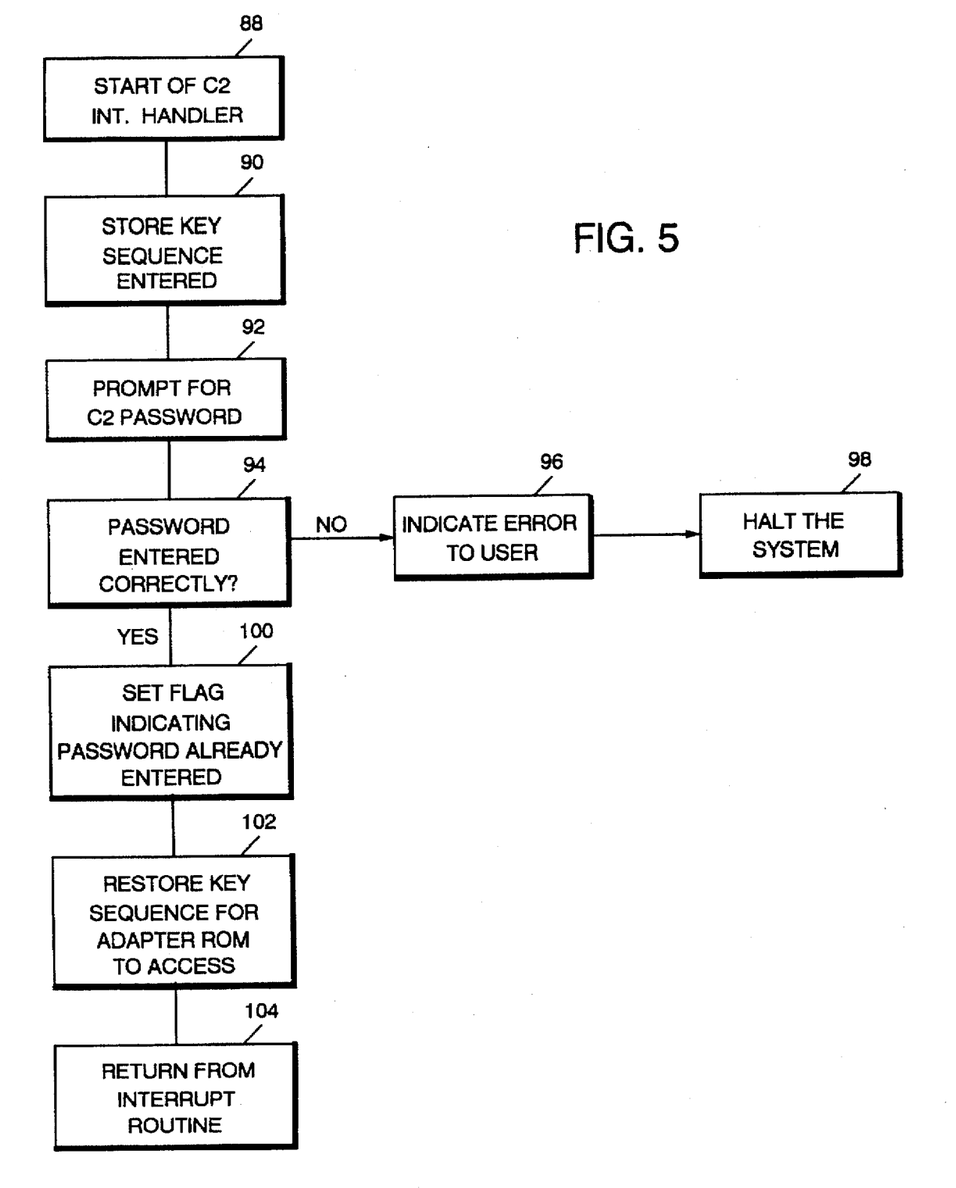

FIGS. 4 and 5 are illustrative of the process which includes the interrupt handler that is hooked prior to the ROM scan and wherein the password protection lies. This interrupt handler has several functions. If the interrupt handler is activated at step 88, after start of POST, initialization of Minimal Base Functions, enablement of C2 and determination that the password has not been entered at steps 80, 82, 84 and 86, respectively, a user has entered an indeterminate keystroke at step 90 during the ROM scan. The reason for this keystroke is assumed to be the Key Sequence to load the utility from an adapter ROM. Since the Keystroke has been issued, the interrupt handler will first retrieve the Key Sequence from the keyboard controller and store this information.

Once the keystroke information has been stored, the interrupt handler will prompt for the proper password at step 92 to allow for configuration routines to be run for the system. Once the prompt is issued, the interrupt handler will determine if the proper password has been entered at step 94. If it has not, the system will halt and indicate to the user the reason for the halt at steps 98 and 96, respectively.

If however the proper password is entered, the stored keystroke key sequence will be lead back in the queue for handling by the adapter ROM and the interrupt routine finishes through steps 100, 102 and 104, respectively, allowing the adapter ROM to continue running with the proper keystroke information. In addition, the interrupt handler also marks that the password has been correctly entered so that the user is not prompted again during this cycle of the POST code.

This mechanism allows for the proper prompting of the password prior to running any adapter ROM utilities, but maintains the integrity of the customer input. It also ensures proper protection to the configuration utilities of the system.

In accordance with the security features to which the present invention is particularly directed, a security utility program is stored in the system partition of the mass storage device and is inaccessible to either a Normal User or an Unauthorized User of the personal computer system to enable one of either a System Owner or an Authorized User to (a) selectively modify the aforementioned prioritized initial loading program by specifying the number and priority order of the group of a plurality of Initial Program Load (IPL) sources and (b) selectively modify the prioritized initial loading program by deleting the BASIC interpreter program stored in ROM 38 from the group of IPL sources. A master cryptographic key is provided, in the form of data stored at a location in the personal computer system 10 for use in encrypting and decrypting data processed by the CPU 32 under the control of security encoding programs. The master cryptographic key, which will preferably be unique to a specific system 10, is typically accessed and used in conjunction with an individual, and personal cryptographic key assigned to or selected by authorized users. The presence of layered cryptographic keys assures secure control over access to encoded files maintained on a Trusted Computing Base as herein described.

Where a master cryptographic key is provided, a second security utility program is stored in the system partition of the mass storage device for enabling one of a System Owner and an Authorized User to modify the master cryptographic key data.

In the drawings and specifications there has been set forth a preferred embodiment of the invention and, although specific terms are used, the description thus given uses terminology in a generic and descriptive sense only and not for purposes of limitation.

What is claimed is:

1. A secure information handling system operable by entering an authorization key having a central processing unit executing an initialization code, including at least one device having a device utility code capable of controlling the CPU after at least one initialization code instruction has been executed by entering an external input to execute the device utility code, comprising:

a detector for intercepting the external input;

an input handler responsive to detection of the external input for requesting entry of the authorization key before executing the device utility code; and a verification means for verifying the authorization key upon entry.

2. The secure information handling system of claim 1, further including controller means for granting control to the device utility code only upon verification of the authorization key by the verification means.

3. The severe information handling system of claim 2, wherein the controller means further includes interrupt means for halting system operation after verification of the authorization key is attempted and not accomplished.

4. The secure information handling system of claim 1, wherein the external input is a sequence of key strokes on a keyboard.

5. The secure information handling system of claim 1, wherein the at least one device is a peripheral device for complementing system functionality.

6. The secure information handling system of claim 5, wherein the peripheral device includes a non-volatile memory component for storing the device utility code.

7. The secure information handling system of claim 5, wherein the peripheral device is a storage device controller.

8. The secure information handling system of claim 1, wherein the device utility code includes code for system boot sequence.

9. A method for securing access to an information handling system having a CPU, and including at least one device having a utility code comprising the steps of:

executing a POST initialization code;

executing the device utility code capable of controlling the CPU after at least one initialization code instruction has been executed by entering a predefined input;

intercepting the predefined input before executing the device utility code;

requesting entry of an authorization key upon detection of the predefined input;

and verifying authenticity of the authorization key upon entry.

10. The method for securing access to an information handling system of claim 9, further including the step of granting CPU control to the utility code only after verification of the authorization key.

11. The method for securing access to an information handling system of claim 10, further including the steps of halting system operation upon alter-verifying authenticity of the authorization key is attempted and is not accomplished.

12. The method for securing access to an information handling system of claim 9, wherein the predefined input is a sequence of key strokes.

13. The method for securing access to an information handling system of claim 9, wherein the step of executing the device utility comprises a step of configuring complementary system functionality.

14. The method for securing access to an information handling system of claim 13, wherein the device utility code is executed based on instructions stored in a non-volatile memory device.

15. The method for securing access to an information handling system of claim 13, wherein said step of configuring complementary system functionality comprises a step of configuring a storage device controller.

16. The method for securing access to an information handling system of claim 9, wherein the device utility code is capable of setting system boot sequence.

* * * * *